United States Patent [19]

Löfström

[11] 4,421,273
[45] Dec. 20, 1983

[54] METHOD AND APPARATUS FOR SUPPLYING OXYGEN GAS FOR FUEL COMBUSTION

[75] Inventor: Per Löfström, Vällingby, Sweden
[73] Assignee: AGA Aktiebolag, Lidingo, Sweden
[21] Appl. No.: 887,612
[22] Filed: Mar. 17, 1978
[30] Foreign Application Priority Data
  Mar. 18, 1977 [SE] Sweden .............................. 7703089
[51] Int. Cl.³ .............................................. B05B 7/10
[52] U.S. Cl. ...................................... 239/8; 239/406;
                                              239/419.3; 239/424
[58] Field of Search ............... 239/400, 405, 404, 406,
                                 239/419, 419.3, 422, 424, 460, 8

[56] References Cited

U.S. PATENT DOCUMENTS

| | | | |
|---|---|---|---|
| 629,338 | 7/1899 | Chelimsky | 239/404 |
| 1,568,331 | 1/1926 | Harris | 239/419 |
| 1,569,805 | 1/1926 | Hebert | 239/400 |
| 1,881,359 | 10/1932 | Jones | 239/400 |
| 2,362,213 | 11/1944 | Miller et al. | 239/400 |
| 3,310,240 | 3/1967 | Grundman | 239/422 |
| 3,980,233 | 9/1976 | Simmons et al. | 239/406 |

FOREIGN PATENT DOCUMENTS 308786  6/1933  Italy .................................. 239/400

Primary Examiner—John J. Love
Assistant Examiner—Michael J. Forman
Attorney, Agent, or Firm—Larson and Taylor

[57] ABSTRACT

Atomized fuel is sprayed in the form of a cone with the apex of the cone in the aperture of the spray device. Oxygen gas is supplied centrally of the cone and the high temperature resulting from oxygen-supported combustion is generated in the internal portion of the cone. Air, or oxygen-enriched air, supports combustion at the outer surface of the cone thus generating lower temperatures at the outer surface. The extreme thermal stresses experienced by surrounding parts of a spray device used for oxygen-supported combustion are thus reduced.

2 Claims, 3 Drawing Figures

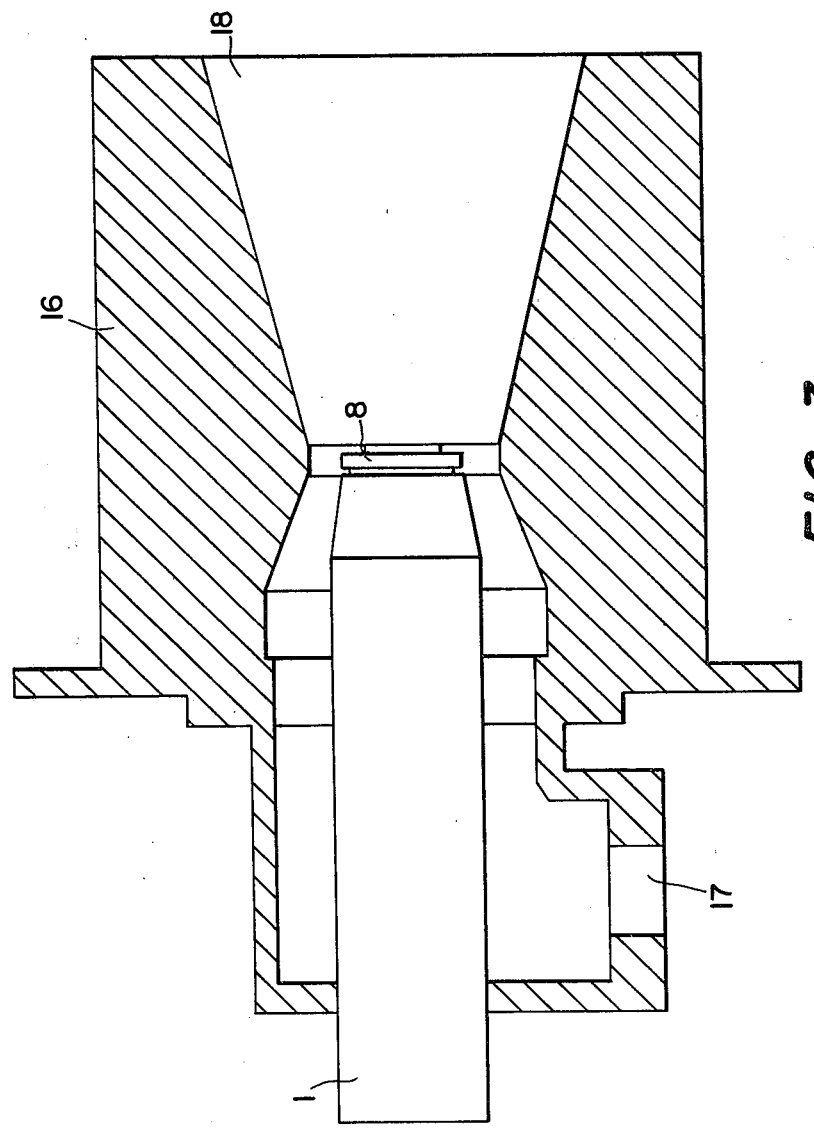

METHOD AND APPARATUS FOR SUPPLYING OXYGEN GAS FOR FUEL COMBUSTION

The present invention relates to a method of supplying oxygen gas for the combustion of liquid, gaseous or powdered fuel, in which method the fuel is caused to pass through a turbulence chamber and a spray device in a manner such that the outflowing, atomized fuel obtains a substantially conical form with the apex of the cone in the aperture of the distributing device. The invention also relates to a device for carrying out the method.

It is an object of the present invention to provide a method by which the fuel-air mixture can be enriched with oxygen in a manner such as to avoid high termal stresses. The invention also relates to an apparatus for carrying out the method. The method is characterized by the fact that subsequent to passing the fuel through a turbulence chamber of an associated spray device, the outflowing, atomized fuel obtains a substantially conical form with the apex of the cone in the aperture of the distributing devcie and by the fact that oxygen gas is supplied centrally of the fuel cone. Combustion air is supplied to the outer, cylindrical surface of said cone. The apparatus for carrying out the method comprises an atomizing device in which there is provided an oxygen-gas passage so arranged as to be encircled by the turbulence chamber and the distributing device.

The invention will now be described in more detail with reference to an embodiment thereof illustrated in the accompanying drawing.

FIG. 3 is a view of the invention arranged in a standard burner.

Figure 1:
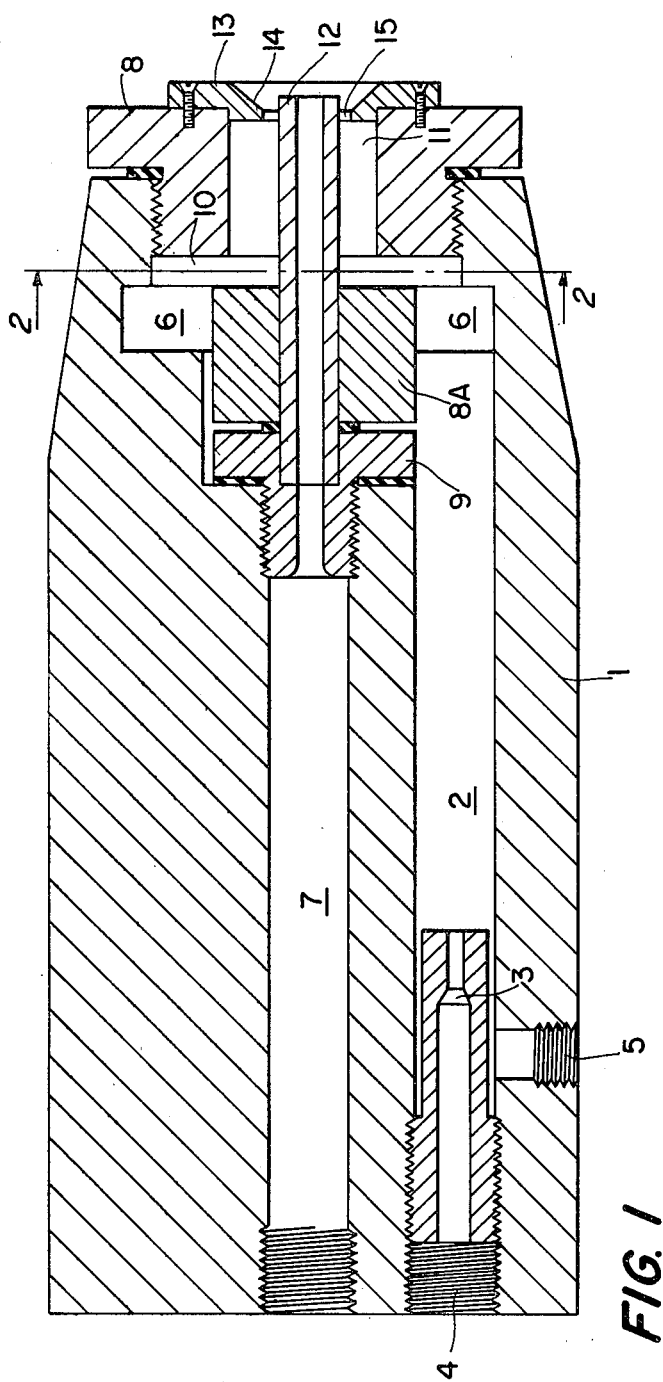
FIG. 1 is a longitudinal sectional view of the spray device.
Figure 2:
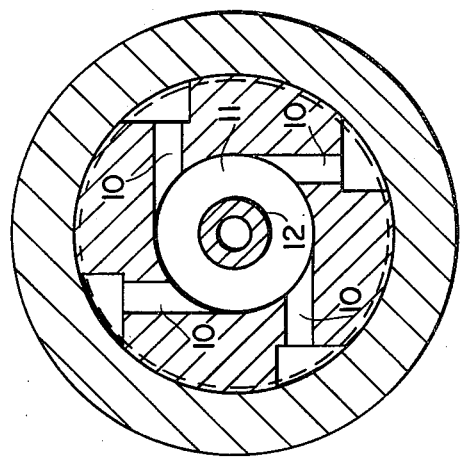
FIG. 2 is a section through the turbulence chamber in said spray device.

The spray device comprises a spray housing 1 in which there is arranged a passage 2 for fuel or fuel emulsion. Prior to being passed to the passage 2, the fuel may be mixed with air, steam or the like by means of an injector 3. If the fuel is atomized by means of, for example, air, the fuel is passed through the passage 4 to the injector and the air through the passage 5, or vice versa. The mixing passage 2 opens out into a distribution chamber 6 arranged in an outlet in the forward portion of the spray housing. The distribution chamber communicates with a turbulence chamber 11 through passages 10. The passages 10 are connected to the turbulence chamber in a manner such to obtain rotation of the gaseous mixture. The distribution chamber 6, the passages 10 and the turbulence chamber 11 are formed by the spray housing and elements 8, 8A, and 9. Arranged at the open end of the turbulence chamber is a throttle plate 13, having an aperture provided with a chamfered edge 14. A further passage 7 for the supply of oxygen gas is arranged along the axis of the spray housing. This passage merges with pipe 12 in the forward part of the spray device, said pipe being shrunk on the element 9. The pipe 12 is encircled by the turbulence chamber and the throttle plate. An annular gap 15 is formed between the pipe and the throttle plate.

When the fuel is, for example, oil, it can be introduced, as previously mentioned, via the line 4 and, to advantage, may be emulsified with air, steam or the like via the connection 5 in the injector 3. The fuel emulsion is then caused to pass through the circular gap 15 between the throttle plate 15 and the insert pipe 12, preferably under rotation.

In this way, the outflowing fuel or the outflowing fuel emulsion obtains a substantially conical shape with the apex of this solid cone located in the aperture of the spray device. Oxygen gas is introduced into the cone through the pipe 12. The gas is thereby passed centrally into the cone. Combustion air is supplied in a suitable manner, such as from ambient air, to the outer surface of the cone. The combustion air is optionally enriched with oxygen gas. For a better explanation of the feeding of ambient air to the solid cone an apparatus according to the invention is arranged in a standard burner 16 as is shown in FIG. 3. The ambient air is fed to the burner by the inlet 17. This combustion air is in the space 18 of the burner fed to the oxygen enriched fuel cone.

In this way, there is obtained a flame in which combustion processes take place in the central part of the cone at very high temperatures, while combustion processes take place at the outer surface of the cone under more normal temperature conditions.

Thus, by means of the described method and the described atomizing device for carrying out the method, those disadvantages previously experienced when enriching combustion air with oxygen gas have been successfully eliminated. By causing those combustion processes which take place at high temperatures to be located in the central parts of the flame, while the outer parts of the flame assumes more normal temperatures, the extreme thermal stresses experienced by surrounding parts of the spray device when the combustion air is enriched with oxygen gas are reduced. The described method and apparatus are therefore well suited for use in burners used, e.g., for high-temperature purposes.

The described device for atomizing the fuel and for supplying oxygen gas is, as mentioned, an example of one embodiment. Variants of the different elements associated with the device are therefore conceivable within the scope of the invention. In the illustrated embodiment, there has been used a liquid fuel. Gaseous and powdered fuel may also be used, in principle, in the same way. Further it is also possible to supply the whole of the oxygen gas required for the process to the central parts of the cone.

What is claimed is:

1. A method of supplying oxygen gas for combustion of a sprayed fuel comprising the steps of atomizing fuel within the body of a spray device having a spray aperture, passing the atomized fuel out of the spray aperture of the spray device as a substantially conical spray with the apex of the cone located in the aperture of the spray device, supplying a gas consisting essentially of oxygen from said spray device centrally of the cone while the atomized fuel is being passed out of the spray aperture whereby combustion of the atomized fuel with said oxygen gas takes place in the central part of said cone, and supplying combustion air to the outer surface of the cone such that the temperature generated at said outer surface is lower than that generated in the central part of the cone.

2. A method according to claim 1 wherein said combustion air is oxygen-enriched.

* * * * *